(12) United States Patent
Grosz (10) Patent No.: US 11,513,719 B2
(45) Date of Patent: Nov. 29, 2022

(54) FAST PURGE ON STORAGE DEVICES

(71) Applicant: Micron Technology, Inc., Boise, ID (US)

(72) Inventor: Nadav Grosz, Broomfield, CO (US)

(73) Assignee: Micron Technology, Inc., Boise, ID (US)

( * ) Notice: Subject to any disclaimer, the term of this patent is extended or adjusted under 35 U.S.C. 154(b) by 610 days.

(21) Appl. No.: 16/554,707

(22) Filed: Aug. 29, 2019

(65) Prior Publication Data

US 2021/0064268 A1  Mar. 4, 2021

(51) Int. Cl.
*G06F 3/06* (2006.01)
*H04L 9/32* (2006.01)

(52) U.S. Cl.
CPC .......... *G06F 3/0652* (2013.01); *G06F 3/0623* (2013.01); *G06F 3/0679* (2013.01); *H04L 9/32* (2013.01)

(58) Field of Classification Search
CPC .... G06F 3/0652; G06F 3/0623; G06F 3/0679; H04L 9/32
See application file for complete search history.

(56) References Cited

U.S. PATENT DOCUMENTS

2018/0052768 A1\* 2/2018 Bae .................... G06F 12/0246
2020/0201785 A1\* 6/2020 Hanna ................. G06F 11/1048

\* cited by examiner

*Primary Examiner* — Hee K Song
(74) *Attorney, Agent, or Firm* — Schwegman Lundberg & Woessner, P.A.

(57) ABSTRACT

A memory device comprises a memory array including memory cells, a communication interface to a host device, and a memory control unit operatively coupled to the memory array and the communication interface. The memory control unit is configured to encrypt write data received via the communication interface to produce encrypted data, program a portion of the memory cells of the memory array with the encrypted data, read the encrypted data from the portion of the memory cells in response to a memory read request, decrypt the read encrypted data to produce read decrypted data only for portions of the read encrypted data not stored in purged regions of the memory array.

20 Claims, 7 Drawing Sheets

| UNMAPPED REGIONS | LBA RANGE | PURGED? |
|---|---|---|
| U1 | 0X0...0X1000 | YES |
| U2 | 0X5000...0X6000 | YES |
| U3 | 0X7000...0X8000 | YES |
| U4 | 0X8000...0X9FFF | YES |

FAST PURGE ON STORAGE DEVICES

Embodiments of the disclosure relate to managed memory devices, and more specifically relate to improvements in purge operations performed on the managed memory devices.

BACKGROUND

Memory devices are typically provided as internal, semiconductor, integrated circuits in computers or other electronic devices. There are many different types of memory including volatile and non-volatile memory. Volatile memory can require power to maintain data and includes random-access memory (RAM), dynamic random-access memory (DRAM), and synchronous dynamic random-access memory (SDRAM), among others. Non-volatile memory can provide persistent data by retaining stored data when not powered and can include NAND flash memory, NOR flash memory, read only memory (ROM), Electrically Erasable Programmable ROM (EEPROM), Erasable Programmable ROM (EPROM), and resistance variable memory such as phase change random access memory (PCRAM), resistive random-access memory (RRAM), and magnetoresistive random access memory (MRAM), 3D XPoint™ memory, among others.

Memory cells are typically arranged in a matrix or an array. Multiple matrices or arrays can be combined into a memory device, and multiple devices can be combined to form a storage volume of a memory system, such as a solid-state drive (SSD), a Universal Flash Storage (UFS™) device, a MultiMediaCard (MMC) solid-state storage device, an embedded MMC device (eMMC™), etc., as discussed further later herein.

Some memory systems encrypt stored in the system to provide enhanced security of the data. Though there is room for improvement in the operation and/or interoperability of currently known systems.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Memory devices, particularly NVM devices, such as NAND flash devices, etc., can include arrays of multi-level memory cells. Memory devices can perform erase, discard and purge operations on the arrays. The discard operation is a non-secure variant of the erase operation. The purge operation requires removal of the data from the unmapped memory space in a more secure manner. In a conventional approach, the information is removed by physically erasing the data using a NAND erase operation. The purge operation can be very lengthy depending on the number of unmapped regions, their size and location.

Memory devices include individual memory die, which may, for example, include including a storage region comprising one or more arrays of memory cells, implementing one (or more) selected storage technologies. Such memory die will often include support circuitry for operating the memory array(s). Other examples, sometimes known generally as "managed memory devices," include assemblies of one or more memory die associated with controller functionality configured to control operation of the one or more memory die. Such controller functionality can simplify interoperability with an external device, as a "host" as discussed later herein. In such managed memory devices, the controller functionality may be implemented on one or more die also incorporating a memory array, or on a separate die). In other examples, one or more memory devices may be combined with controller functionality to form a solid-stage drive (SSD) storage volume.

Embodiments of the present disclosure are described in the example of managed memory devices implementing NAND flash memory cells, termed "managed NAND" devices. These examples, however, are not limiting on the scope of the disclosure, which may be implemented in other forms of memory devices and/or with other forms of storage technology.

Both NOR and NAND flash architecture semiconductor memory arrays are accessed through decoders that activate specific memory cells by selecting the word line coupled to their gates. In a NOR architecture semiconductor memory array, once activated, the selected memory cells place their data values on bit lines, causing different currents to flow depending on the state at which a particular cell is programmed. In a NAND architecture semiconductor memory array, a high bias voltage is applied to a drain-side select gate (SGD) line. Word lines coupled to the gates of the unselected memory cells of each group are driven at a specified pass voltage (e.g., Vpass) to operate the unselected memory cells of each group as pass transistors (e.g., to pass current in a manner unrestricted by their stored data values). Current then flows from the source line to the bit line through each series coupled group, restricted only by the selected memory cells of each group, placing current encoded data values of selected memory cells on the bit lines.

Each flash memory cell in a NOR or NAND architecture semiconductor memory array can be programmed individually or collectively to one or a number of programmed states. For example, a single-level cell (SLC) can represent one of two programmed states (e.g., 1 or 0), representing one bit of data. Flash memory cells can also represent more than two programmed states, allowing the manufacture of higher density memories without increasing the number of memory cells, as each cell can represent more than one binary digit (e.g., more than one bit). Such cells can be referred to as multi-state memory cells, multi-digit cells, or multi-level cells (MLCs). In certain examples, MLC can refer to a memory cell that can store two bits of data per cell (e.g., one of four programmed states), a triple-level cell (TLC) can refer to a memory cell that can store three bits of data per cell (e.g., one of eight programmed states), and a quad-level cell (QLC) can store four bits of data per cell. MLC is used herein in its broader context, to refer to any memory cell(s) that can store more than one bit of data per cell (i.e., that can represent more than two programmed states).

Managed memory devices may be configured and operated in accordance with recognized industry standards. For example, managed NAND devices may be (as non-limiting examples), a Universal Flash Storage (UFS™) device, or an embedded MMC device (eMMC™), etc. For example, in the case of the above examples, UFS devices may be configured in accordance with Joint Electron Device Engineering Council (JEDEC) standards (e.g., JEDEC standard JESD223D, entitled JEDEC UFS Flash Storage 3.0, etc., and/or updates or subsequent versions to such standard. Similarly, identified eMMC devices may be configured in accordance with JEDEC standard JESD84-A51, entitled "JEDEC eMMC standard 5.1", again, and/or updates or subsequent versions to such standard.

An SSD can be used as, among other things, the main storage device of a computer, having advantages over traditional hard drives with moving parts with respect to, for example, performance, size, weight, ruggedness, operating temperature range, and power consumption. For example, SSDs can have reduced seek time, latency, or other delay associated with magnetic disk drives (e.g., electromechanical, etc.). SSDs use non-volatile memory cells, such as flash memory cells to obviate internal battery supply requirements, thus allowing the drive to be more versatile and compact. Managed memory devices, for example managed NAND devices, can be used as primary or ancillary memory in various forms of electronic devices, and are commonly used in mobile devices.

Both SSDs and managed memory devices can include a number of memory devices, including a number of dies or logical units (e.g., logical unit numbers or LUNs), and can include one or more processors or other controllers performing logic functions required to operate the memory devices or interface with external systems. Such SSDs and managed memory devices can include one or more flash memory die, including a number of memory arrays and peripheral circuitry thereon. The flash memory arrays can include a number of blocks of memory cells organized into a number of physical pages. In some examples, the SSDs can also include DRAM or SRAM (or other forms of memory die or other memory structures). Similarly, managed NAND devices can include one or more arrays of volatile and/or nonvolatile memory separate from the NAND storage array, and either within or separate from a controller. Both SSDs and managed NAND devices can receive commands from a host in association with memory operations, such as read or write operations to transfer data (e.g., user data and associated integrity data, such as error data and address data, etc.) between the memory devices and the host, or erase operations to erase data from the memory devices.

Figure 1:
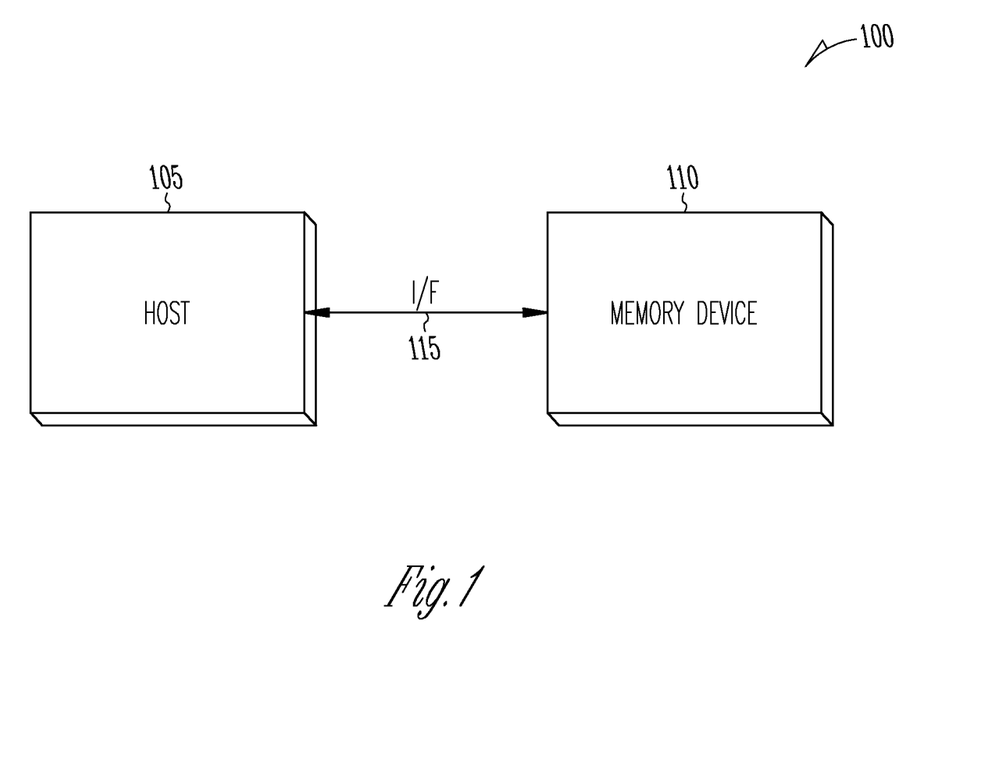
FIG. 1 illustrates an example system including a host and a memory device.

FIG. 1 illustrates an example system 100 including a host 105 and a memory device 110. The host 105 can include a host processor, a central processing unit, or one or more other device, processor, or controller. The memory device 110 can include a universal flash storage (UFS) device, an embedded MMC (eMMCT™) device, or one or more other memory devices. The host 105 and the memory device 110 can communicate using a communication interface (I/F) 115 (e.g., a bidirectional parallel or serial communication interface).

In an example, the memory device 110 can include a UFS device, and the communication interface 115 can include a serial bidirectional interface, such as defined in one or more Joint Electron Device Engineering Council (JEDEC) standards (e.g., JEDEC standard D223D (JESD223D), commonly referred to as JEDEC UFS Host Controller Interface (UFSHCI) 3.0, etc.). In another example, the memory device 110 can include an eMMCT™ device, and the communication interface 115 can include a number of parallel bidirectional data lines (e.g., DAT[7:0]) and one or more command lines, such as defined in one or more JEDEC standards (e.g., JEDEC standard D84-B51 (JESD84-A51), commonly referred to as JEDEC eMMC standard 5.1, etc.). In other examples, the memory device 110 can include one or more other memory devices, or the communication interface 115 can include one or more other interfaces, depending on the host 105 and the memory device 110. The identified standards are provided only as example environments in which the described methods and structures may be utilized; but such methods and structures may be utilized in a variety of environments outside of the identified standards (or of any actual or proposed standards).

Each of the host 105 and the memory device 110 can include a number of receiver or driver circuits configured to send or receive signals over the communication interface 115, or interface circuits, such as data control units, sampling circuits, or other *intermedia* circuits configured to process data to be communicated over, or otherwise process data received from the communication interface 115 for use by the host 105, the memory device 110, or one or more other circuits or devices.

The memory device 110 can include a memory array (e.g., one or more arrays of memory cells, such as a NAND flash memory array, or one or more other memory arrays), a memory control unit, and in certain examples, an interface circuit between the memory array and the memory control unit. In certain embodiments, the memory array can include a number of memory die, each having control logic separate from the memory control unit. The memory control unit can include an application specific integrated circuit (ASIC), a field programmable gate array (FPGA), or one or more other processing circuits arranged or programmed to manage data transfers or operations to, from, or within the memory array.

Figure 2:
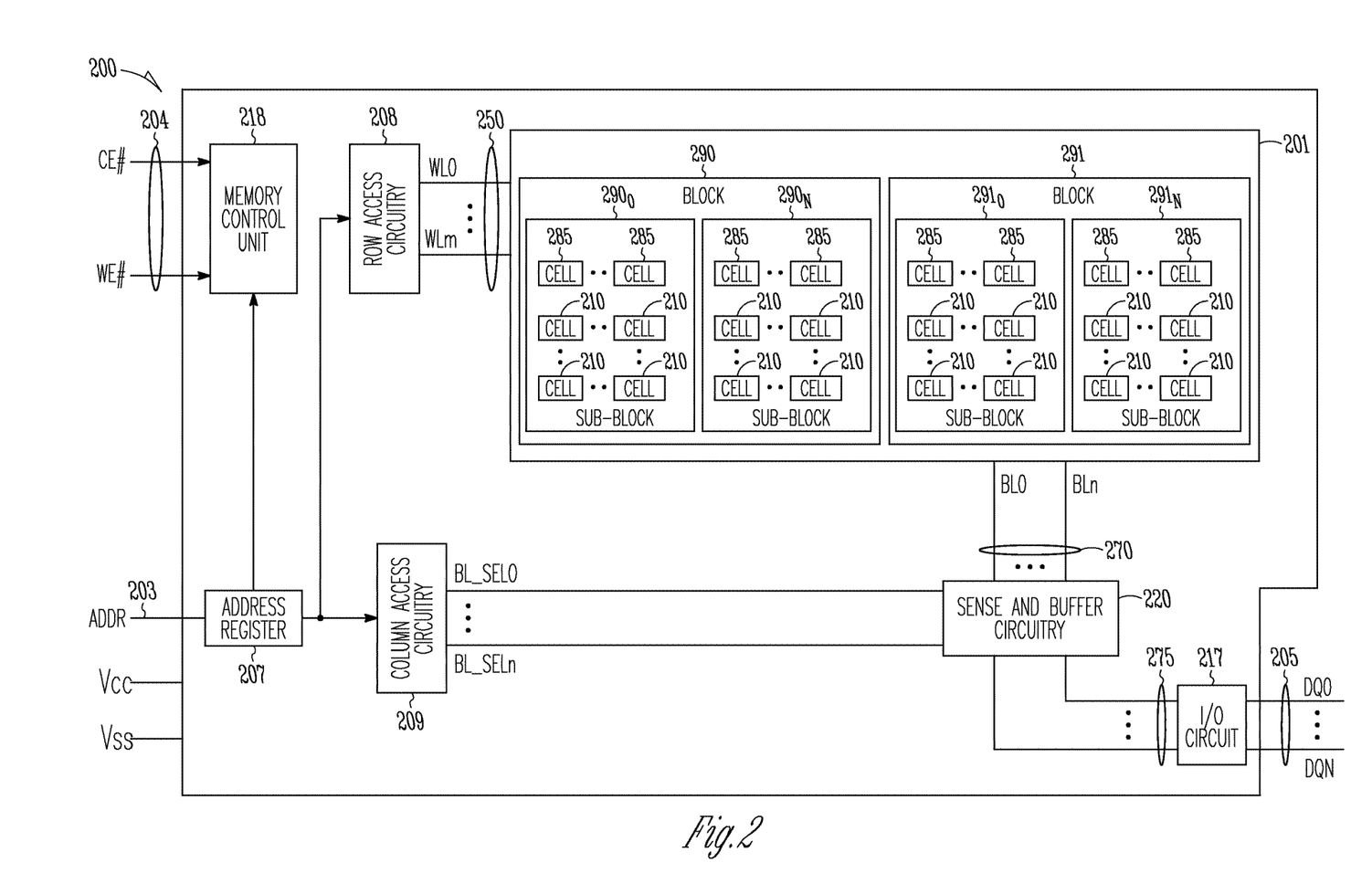
FIG. 2 is a block diagram of an apparatus in the form of a memory device including non-volatile memory cells.

FIG. 2 shows a block diagram of an example memory device 200 suitable for use as memory device 110 in FIG. 1. The memory device can include non-volatile memory cells having mixed memory cell types integrated in the same integrated circuit (IC) chip, according to some embodiments described herein. Memory device 200 can include a memory array (or multiple memory arrays) 201 containing memory cells 210 and 285. In the physical structure of memory device 200, memory cells 210 and 285 can be arranged vertically (e.g., stacked over each other) over a substrate of memory device 200 (e.g., a semiconductor substrate of an IC chip that includes memory device 200). Memory cells 210 and 285 can include non-volatile cells. Memory cells 210 and 285 can have different non-volatile memory cell types. For example, memory cells 210 can include floating gate memory cells, charge trap memory cells, or other types of non-volatile memory cells. Memory cells 285 can include ferroelectric memory cells, phase change memory cells, resistive memory cells, conduction bridge memory cells, and spin-transfer-torque magnetic random access memory (STT-MRAM) cells, or other types of non-volatile memory cells.

As shown in FIG. 2, memory cells 210 and 285 can be arranged in blocks (memory cell blocks), such as blocks 290 and 291. Each of blocks 290 and 291 can include sub-blocks. For example, block 290 can include sub-blocks $290_0$ and $290_n$, and block 291 can include sub-blocks $291_0$ and $291_n$. Each of sub-blocks $290_0$, $290_n$, $291_0$, and $291_n$ can include a combination of memory cells 210 and 285. FIG. 2 shows memory device 200 having two blocks 290 and 291 and two sub-blocks in each of the blocks as an example. Memory device 200 can have more than two blocks and more than two sub-blocks in each of the blocks.

As shown in FIG. 2, memory device 200 can include access lines (which can include word lines) 250 and data lines (which can include bit lines) 270. Access lines 250 can carry signals (e.g., word line signals) WL0 through WLm. Data lines 270 can carry signals (e.g., bit line signals) BL0 through BLn. Memory device 200 can use access lines 250 to selectively access sub-blocks $290_0$, $290_n$, $291_0$, and $291_n$ of blocks 290 and 291 and data lines 270 to selectively exchange information (e.g., data) with memory cells 210 of blocks 290 and 291.

Memory device 200 can include an address register 207 to receive address information (e.g., address signals) ADDR on lines (e.g., address lines) 203. Memory device 200 can include row access circuitry 208 and column access circuitry 209 that can decode address information from address register 207. Based on decoded address information, memory device 200 can determine which memory cells 210 of which sub-blocks of blocks 290 and 291 are to be accessed during a memory operation. Memory device 200 can perform a read operation to read (e.g., sense) information (e.g., previously stored information) in memory cells 210, or a write (e.g., program) operation to store (e.g., program) information in memory cells 210. Memory device 200 can use data lines 270 associated with signals BL0 through BLn to provide information to be stored in memory cells 210 or obtain information read (e.g., sensed) from memory cells 210. Memory device 200 can also perform an erase operation to erase information from some or all of memory cells 210 of blocks 290 and 291.

Memory device 200 can include a memory control unit 218 (which can include components such as a state machine (e.g., finite state machine), register circuits, and other components) configured to control memory operations (e.g., read, write, and erase operations) of memory device 200 based on control signals on lines 204. Examples of the control signals on lines 204 include one or more clock signals and other signals (e.g., a chip enable signal CE#, a write enable signal WE#) to indicate which operation (e.g., read, write, or erase operation) memory device 200 can perform.

Memory device 200 can include sense and buffer circuitry 220 that can include components such as sense amplifiers and page buffer circuits (e.g., data latches). Sense and buffer circuitry 220 can respond to signals BL_SEL0 through BL_SELn from column access circuitry 209. Sense and buffer circuitry 220 can be configured to determine (e.g., by sensing) the value of information read from memory cells 210 (e.g., during a read operation) of blocks 290 and 291 and provide the value of the information to lines (e.g., global data lines) 275. Sense and buffer circuitry 220 can also can be configured to use signals on lines 275 to determine the value of information to be stored (e.g., programmed) in memory cells 210 of blocks 290 and 291 (e.g., during a write operation) based on the values (e.g., voltage values) of signals on lines 275 (e.g., during a write operation).

Memory device 200 can include input/output (I/O) circuitry 217 to exchange information between memory cells 210 of blocks 290 and 291 and lines (e.g., I/O lines) 205. Signals DQ0 through DQN on lines 205 can represent information read from or stored in memory cells 210 of blocks 290 and 291. Lines 205 can include nodes within memory device 200 or pins (or solder balls) on a package where memory device 200 can reside. Other devices external to memory device 200 (e.g., a memory controller, memory control unit, or a processor) can communicate with memory device 200 through lines 203, 204, and 205.

Memory device 200 can receive a supply voltage, including supply voltages Vcc and Vss. Supply voltage Vss can operate at a ground potential (e.g., having a value of approximately zero volts). Supply voltage Vcc can include an external voltage supplied to memory device 200 from an external power source such as a battery or alternating current to direct current (AC-DC) converter circuitry.

Each of memory cells 210 can be programmed individually or collectively to one or a number of programmed states. For example, a single-level cell (SLC) can represent one of two programmed states (e.g., 1 or 0), representing one bit of data. However, flash memory cells can also represent one of more than two programmed states, allowing the manufacture of higher density memories without increasing the number of memory cells, as each cell can represent more than one binary digit (e.g., more than one bit). Such cells can be referred to as multi-state memory cells, multi-digit cells, or multi-level cells (MLCs). In certain examples, MLC can refer to a memory cell that can store two bits of data per cell (e.g., one of four programmed states), a triple-level cell (TLC) can refer to a memory cell that can store three bits of data per cell (e.g., one of eight programmed states), and a quad-level cell (QLC) can store four bits of data per cell. MLC is used herein in its broader context, to refer to any memory cell that can store more than one bit of data per cell (i.e., that can represent more than two programmed states).

In another example, each of memory cells 210 can be programmed to store information representing a value for multiple bits, such as one of four possible values "00", "01", "10", and "11" of two bits, one of eight possible values "000", "001", "010", "011", "100", "101", "110", and "111" of three bits, or one of other values of another number of multiple bits. A cell that has the ability to store multiple bits is sometimes called a multi-level cell (or multi-state cell).

Memory device 200 can include a non-volatile memory device, such that memory cells 210 and 285 can retain information stored thereon when power (e.g., voltage Vcc, Vss, or both) is disconnected from memory device 200. For example, memory device 200 can be a flash memory device, such as a NAND flash (e.g., 3-dimensional (3-D) NAND) or a NOR flash memory device, or another kind of memory device, such as a variable resistance memory device (e.g., a phase change memory device or a resistive RAM (Random Access Memory) device). One of ordinary skill in the art may recognize that memory device 200 may include other components not shown in FIG. 2 so as not to obscure the example embodiments described herein.

Figure 3:
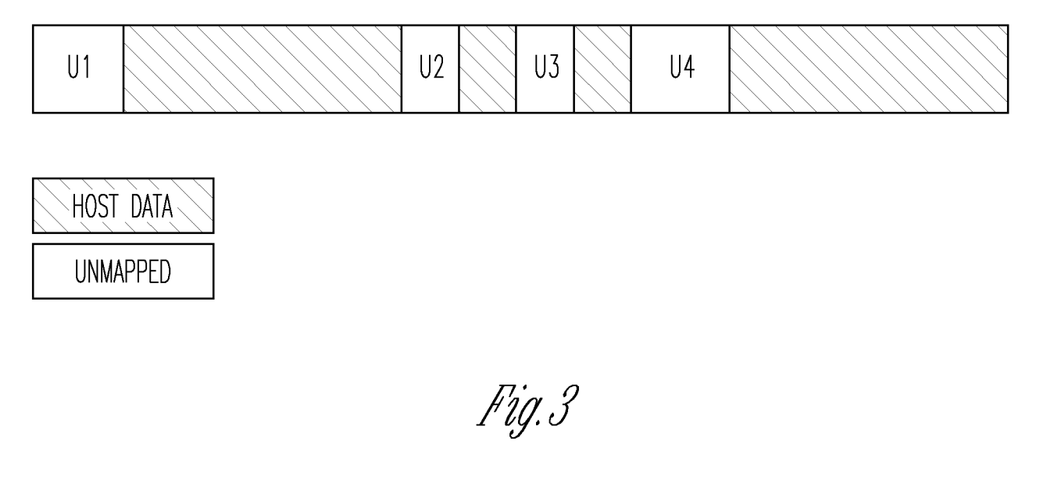
FIG. 3 is an illustration representing an example of a region of physical memory in the memory array.

In addition to erase operations, the memory device 200 can perform discard and purge operations. The discard operation is a non-secure variant of the erase function. The memory control unit 218 may map virtual memory addresses to the physical memory cells of the memory array. The discard operation unmaps the virtual memory from the physical memory. FIG. 3 is an illustration representing an example of a region of physical memory suitable for use in a memory array 201 described relative to FIG. 2. Regions U1, U2, U3, and U4 are unmapped using the discard operation. The other regions of the memory array contain host data. The distinction between discard and erase is the behavior of the memory device. In discard, the memory device is not required to guarantee that a host would not retrieve the original data from one or more logical block addresses (LBAs) that were marked for discard when a read operation is directed to the LBAs.

The purge operation operates on unmapped address space and results in removing all the data from the unmapped address space. This is done according to a parameter value set inside the memory device. This parameter value may be set to reflect that information will be removed using a vendor defined mechanism (e.g., an erase mechanism). The purge operation can be a very lengthy process which depends on the number of unmapped regions, their size and their location. The example of FIG. 3 only includes four unmapped regions to simplify the illustration. Unlike the discard operation where the device must guarantee that a host would not retrieve the original data from one or more LBAs that were marked for discard when a read operation is directed to the LBAs, the purge operation mandates a removal of the data from the unmapped space in a more secure manner. In a conventional approach, the information is removed by physically erasing the data using a NAND erase operation. An improved approach for a purge operation is to use encryption/decryption to ensure that a host does not have access to purged data while eliminating the latency from removal of the data.

Figure 4:
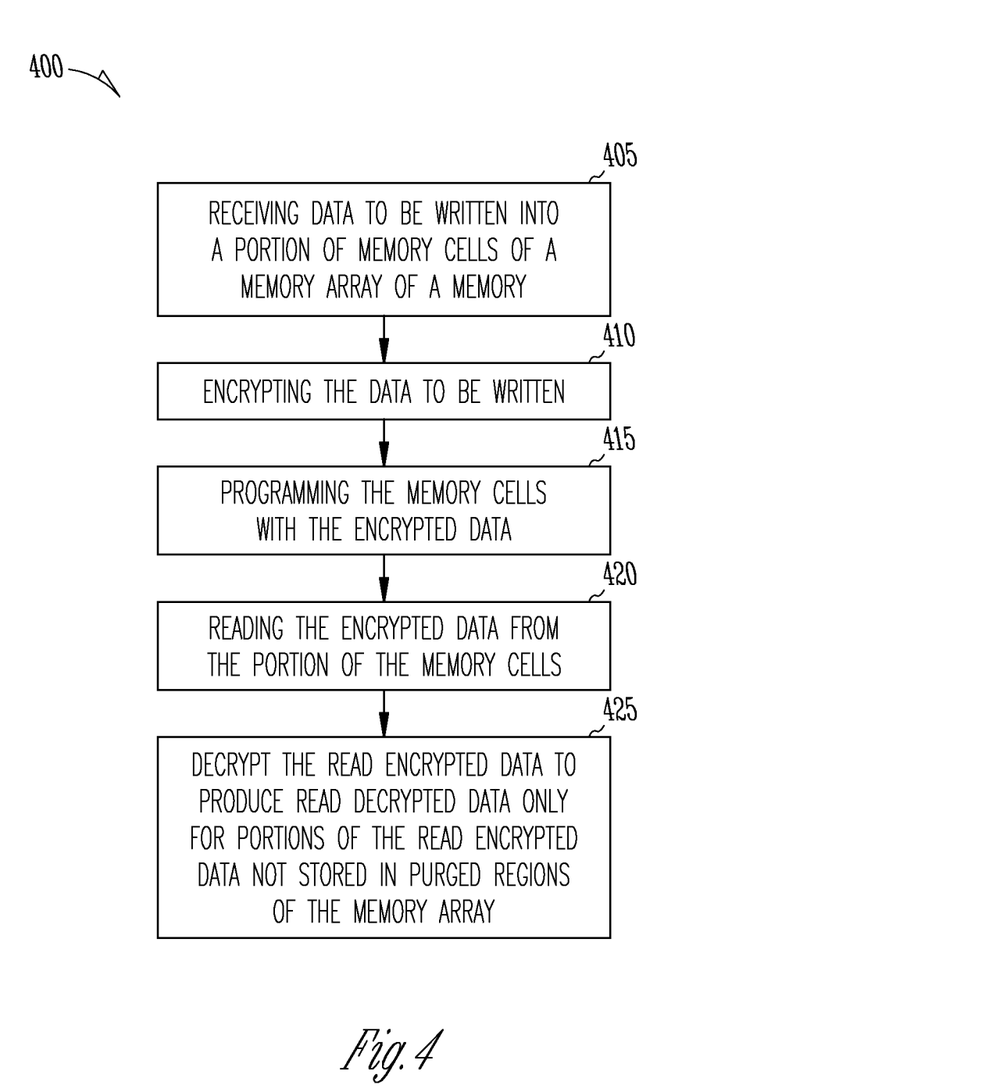
FIG. 4 is a flow diagram of a method of operating a memory device to perform a purge operation.

FIG. 4 is a flow diagram of a method 400 of operating a memory device, for example by a memory device 110 as described relative to FIG. 1, or a memory device 200 as described relative to FIG. 2, to perform a purge operation. At 405 data is received at the memory device for writing into memory cells of the memory array. At 410, the data to be written is encrypted, and the encrypted data is programmed into the memory cells at 415. When a read request is received to read the written encrypted data, the encrypted data is read from memory at 420 and the read encrypted data is decrypted at 425 to produce read data before sending the read data to the requesting device (e.g., host 105 in FIG. 1). Encrypted read data is only decrypted when the read data is not stored in purged regions of the memory array.

If the portion of the memory cells being read is included in a purged portion of the memory array, the decrypting is omitted when producing the read data. Encrypted data may be sent to the requesting device which is unusable by the requesting device. Thus, the new purge approach adheres to the definition of a purge operation by preventing the requesting device from retrieving the original data, but the purge operation does not involve a lengthy erase operation.

Figure 5:
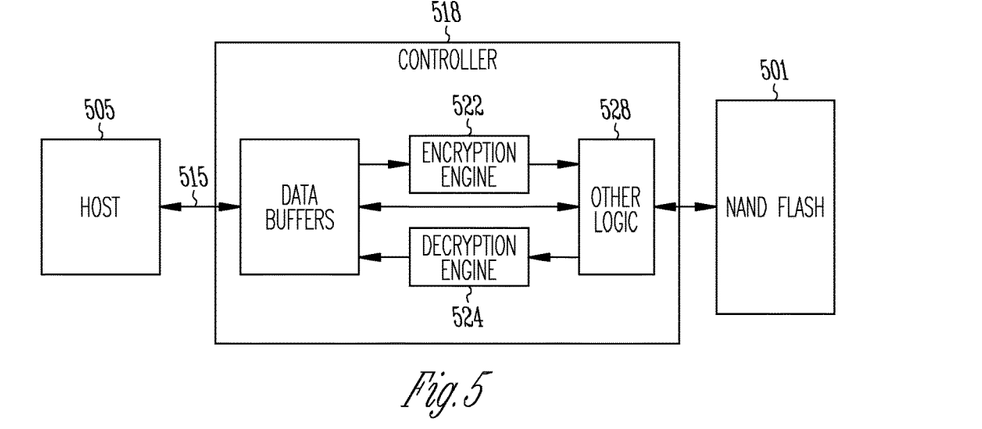
FIG. 5 is a block diagram of portions of an example of a memory device.

FIG. 5 is a block diagram of portions of an example of a memory device suitable for use as memory device 110 in FIG. 1, or memory device 200 in FIG. 2. The memory device includes a memory array 501, a memory control unit 518, and a communication interface 515 to operatively couple the memory control unit 518 and a host device 505. The memory control unit 518 encrypts write data received via the communication interface. The memory control unit 518 also initiates programming of the physical memory cells with the encrypted data. The memory control unit 518 can include an encryption engine 522. An "engine" refers to a block of logic circuitry of the memory control unit 518 dedicated to performing encryption functions. In this way, the encryption of data is deterministic in that the number of clock cycles needed to encrypt data is always the same and doesn't vary with the load on other circuitry (e.g., processing circuitry) of the memory control unit 518.

Figure 6A:
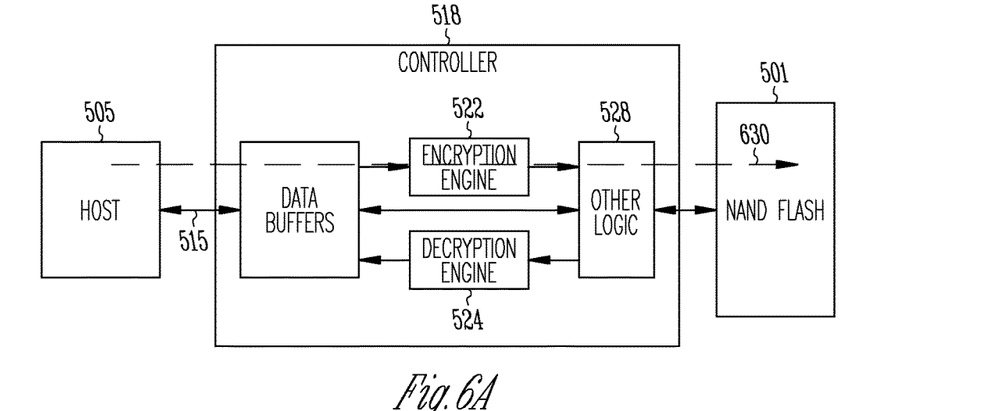
FIG. 6A is a block diagram of a memory device showing the write data path.

FIG. 6A is the block diagram of the example memory device of FIG. 5 showing the write data path 630. Data can be received at the communication interface from the host device into buffers 526 of the memory control unit. Data is encrypted by encryption engine 522. The encryption engine may be configured to encrypt data using a symmetric key encryption such as Advanced Encryption Standard (AES). In some embodiments, the encryption engine 522 encrypts the data on the fly using a content encryption key (CEK). The memory control unit 518 can include other logic circuitry 528 (e.g., flash control logic circuitry) to write the encrypted data to the memory array 501. The logic circuitry 528 may perform functions related to distributing the data among the memory cells.

Figure 6B:
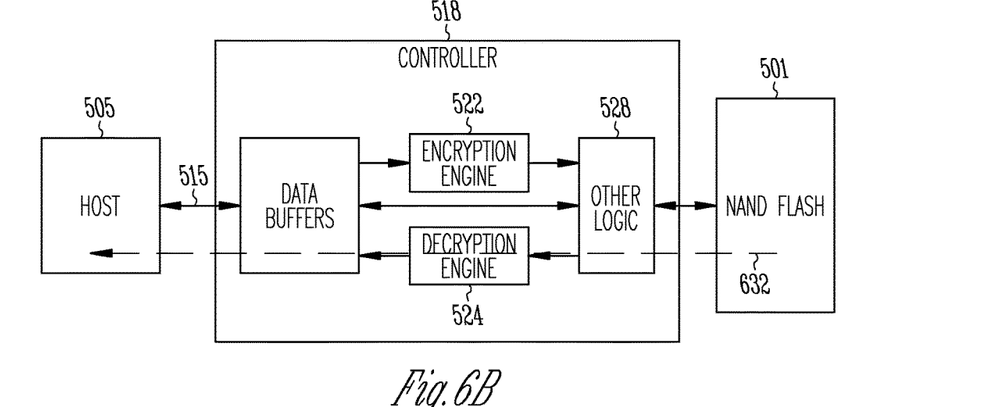
FIG. 6B is a block diagram of a memory device showing the read data path.

The memory control unit 518 reads encrypted data from the memory array as part of a read operation, such as in response to a read request from a host application or host device. When the encrypted data is read it is decrypted to produce read data. The memory control unit 518 can include a decryption engine 524 to perform decryption functions. The read data is then provided to the requesting device. FIG. 6B is the block diagram of the memory device of the example of FIG. 5 showing the read data path 632. In some embodiments, upon receiving a read operation from the host device, the memory control unit 518 will read the data from the memory array 501, and decrypt the data using the same CEK used to encrypt the data and send the decrypted data to the host as read data.

Figure 7:
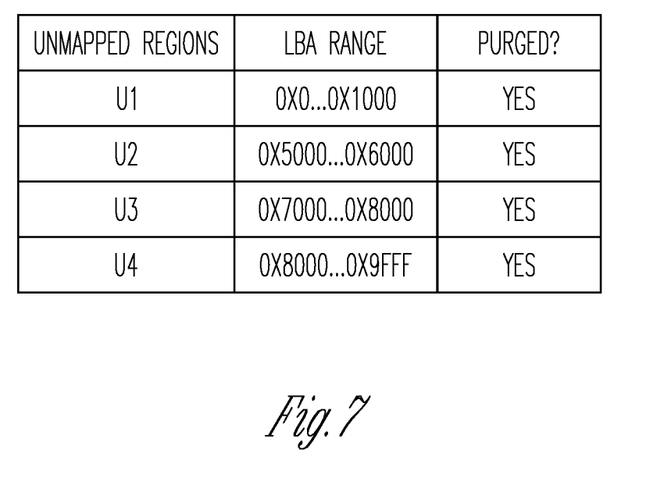
FIG. 7 is an example of a table useable to track unmapped logical addresses.

As explained previously, the memory control unit 518 performs discard operations. The memory control unit 518 may generate a reference structure (e.g., a data structure such as a table in memory) to track unmapped portions of the memory array. FIG. 7 is an example of a reference structure internal to the memory array, suitable for use with the example memory array 201 of FIG. 2, or with the example memory control unit 218 of FIG. 2, to track unmapped LBAs when a discard command or other discard indication is received by the memory control unit 518. The entries in the reference structure match the unmapped regions in the example region of physical memory of FIG. 3. Only four unmapped regions are shown to simplify the Figure.

When a memory purge command or other purge indication is received, the memory control unit 518 goes over the reference structure of unmapped regions and marks the reference structure entry as purged according to the memory purge command. This indicates the area of unmapped memory to which the host should not have access. When the host attempts to read data from a purged region of the memory array, the memory control unit 518 omits decrypting the encrypted data. In some embodiments, the memory control unit 518 transfers encrypted data via the communication interface when the read data is included in table entries indicated to be purged LBAs. The host does not have decryption information (e.g., the CEK), so the encrypted data is not usable by the host device. In some embodiments, the memory control unit 518 transfers specified "purge data" instead of read data (either encrypted or unencrypted) to the host via the communication interface when the portion of the memory cells containing the read data is a purged portion of memory cells of the memory array. For example, the memory control unit 518 may transfer "dummy data" not representative of substantive data (e.g., all zeros, all ones or other bit sequence) to the host as the specified purge data.

Figure 8:
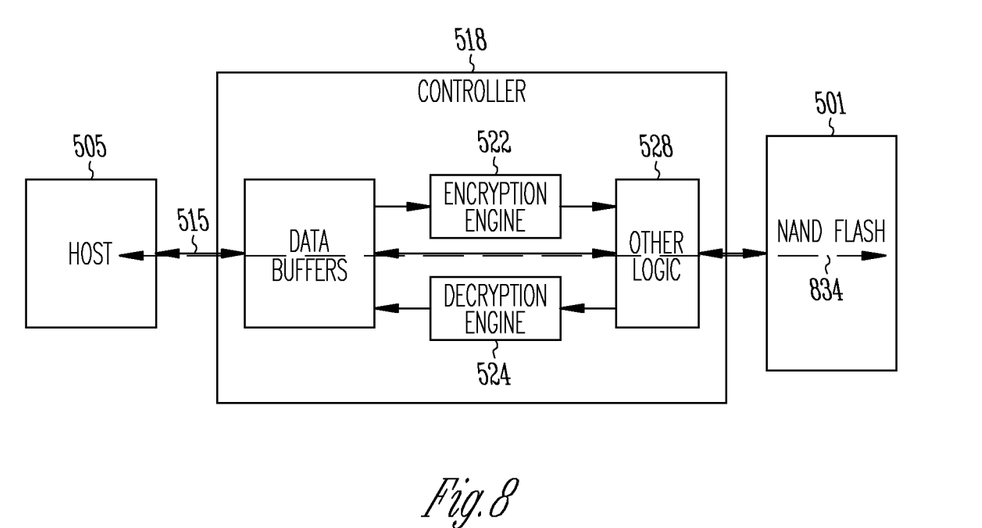
FIG. 8 is a block diagram of a memory device showing an alternate write path or read path.

FIG. 8 is the block diagram of the example memory device of FIG. 5 showing an alternate write path or read path. This write/read path bypasses the encryption and decryption engines of the memory control unit. Not all data to be written to memory is encrypted. For example, firmware code and some data management tables are types of data that may not be encrypted when written, and this unencrypted memory data is not subject to decryption when read. The memory control unit 518 may determine that data is excluded from encryption/decryption by address of the data. For example, firmware code may be included in a reserved address space.

This direct write/read path to and from the memory cells can be used to provide encrypted data back to the host device if the encrypted data was purged, or to provide the specified purge data to the host device. Sending either encrypted data or the specified purge data still adheres to the definition of preventing the host from retrieving the purged data. The original data which was written to the NAND flash is now encrypted and the memory control unit 518 will not send valid decrypted data to the host. If the host (or an attacker) tries to bypass the memory control unit and read the data directly from the NAND flash, it will still be only able to read the encrypted copy of the data which would not be usable.

The methods and devices described herein improve the latency for a purge operation. The memory device ensures that a host device does not retrieve usable original data from one or more LBAs that were marked for purge when a read operation is directed to the LBAs without performing erase operations to remove the data.

Figure 9:
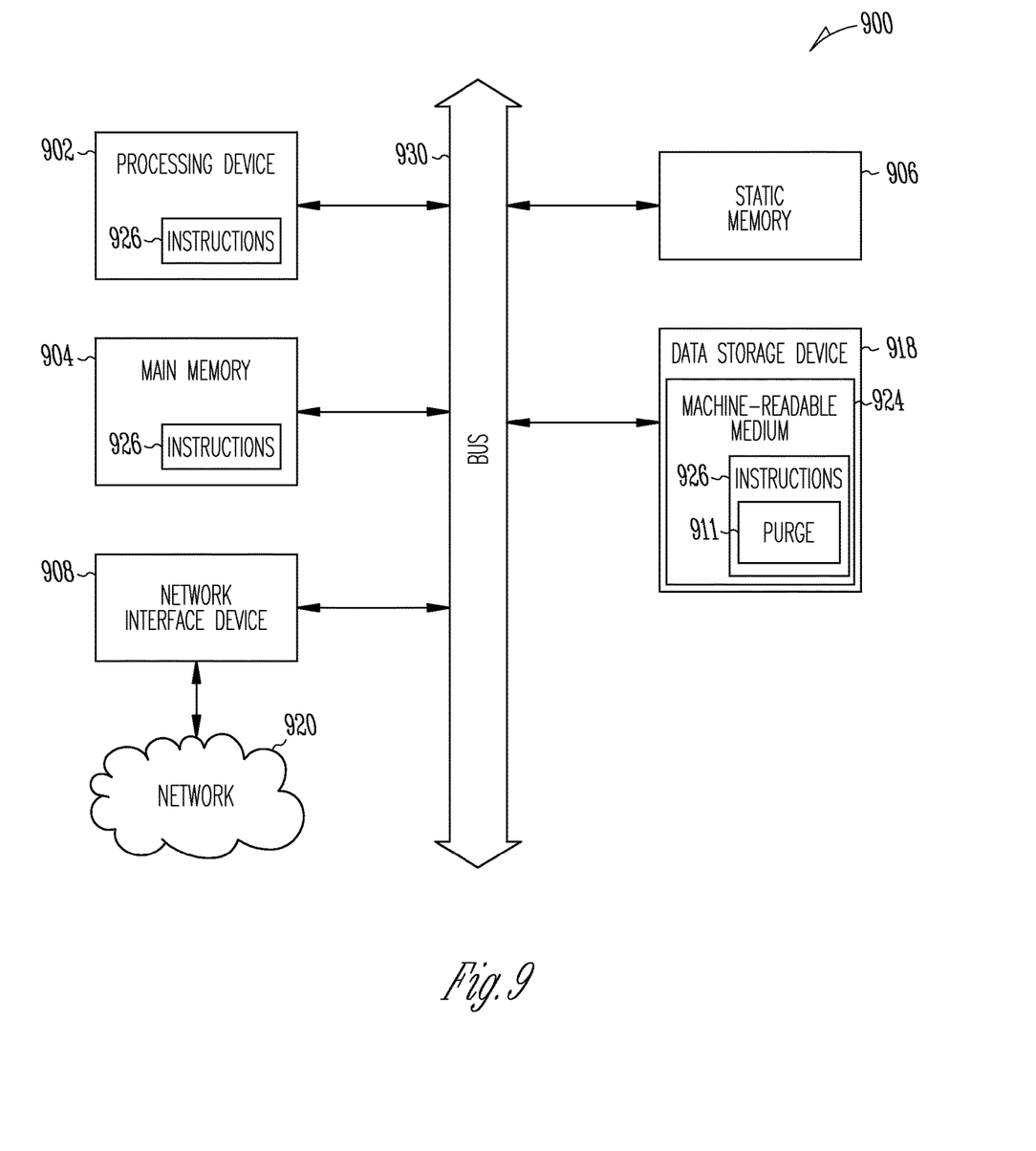
FIG. 9 illustrates a block diagram of an example machine according to some embodiments described herein.

FIG. 9 illustrates a block diagram of an example machine 900 that may include for example a host device and a memory device as described relative to FIG. 1, that may perform one or more of the techniques (e.g., methodologies) discussed herein, such as the described discard and purge operations for example. In alternative embodiments, the machine 900 may operate as a standalone device or may be connected (e.g., networked) to other machines. In a networked deployment, the machine 900 may operate in the capacity of a server machine, a client machine, or both in server-client network environments. In an example, the machine 900 may act as a peer machine in peer-to-peer (P2P) (or other distributed) network environment. The machine 900 may be a personal computer (PC), a tablet PC, a set-top box (STB), a personal digital assistant (PDA), a mobile telephone, a web appliance, an IoT device, automotive system, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The embodiments and examples, as described herein, may include, or may operate by, logic, components, devices, packages, or mechanisms. Circuitry is a collection (e.g., set) of circuits implemented in tangible entities that include hardware (e.g., simple circuits, gates, logic, etc.). Circuitry membership may be flexible over time and underlying hardware variability. Circuitries include members that may, alone or in combination, perform specific tasks when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer-readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable participating hardware (e.g., the execution units or a loading mechanism) to create members of the circuitry in hardware via the variable connections to carry out portions of the specific tasks when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

The machine (e.g., computer system) 900 (e.g., the host 105, the memory device 110 of FIG. 1, etc.) may include a processing device 902 (e.g., a hardware processor, a central processing unit (CPU), a graphics processing unit (GPU), a hardware processor core, or any combination thereof, such as a memory control unit of the memory device 110, etc.), a main memory 904 (e.g., read-only memory (ROM), flash memory, dynamic random-access memory (DRAM) such as synchronous DRAM (SDRAM) or Rambus DRAM (RDRAM), etc.), a static memory 906 (e.g., flash memory, static random-access memory (SRAM), etc.), and a data storage system 918, some or all of which may communicate with each other via an interlink (e.g., bus) 930.

The processing device 902 can represent one or more general-purpose processing devices such as a microprocessor, a central processing unit, or the like. More particularly, the processing device 902 can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 902 can also be one or more special-purpose processing devices such as an application specific integrated circuit (ASIC), a field programmable gate array (FPGA), a digital signal processor (DSP), network processor, or the like. The processing device 902 can be configured to execute instructions 926 for performing the operations and steps discussed herein. The machine 900 can further include a network interface device 908 to communicate over a network 920.

The data storage system 918 can include a machine-readable storage medium 924 (also known as a computer-readable medium) on which is stored one or more sets of instructions 926 or software embodying any one or more of the methodologies or functions described herein. The instructions 926 can also reside, completely or at least partially, within the main memory 904 or within the processing device 902 during execution thereof by the machine 900, the main memory 904 and the processing device 902 also constituting machine-readable storage media. The machine-readable storage medium 924, the data storage system 918, or the main memory 904 can correspond to the memory device 110 of FIG. 1. In one implementation, the instructions 926 include instructions 911 to implement functionality corresponding to a purge operation (e.g., the purge operation of FIG. 4).

While the machine-readable storage medium 924 is shown in an example implementation to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media. In an example, a massed machine-readable medium comprises a machine-readable medium with a plurality of particles having invariant (e.g., rest) mass. Accordingly, massed machine-readable media are not transitory propagating signals. Specific examples of massed machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The machine 900 may further include a display unit, an alphanumeric input device (e.g., a keyboard), and a user interface (UI) navigation device (e.g., a mouse). In an example, one or more of the display unit, the input device, or the UI navigation device may be a touch screen display. The machine a signal generation device (e.g., a speaker), or one or more sensors, such as a global positioning system (GPS) sensor, compass, accelerometer, or one or more other sensor. The machine 900 may include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The instructions 926 (e.g., software, programs, an operating system (OS), etc.) or other data are stored on the data storage device 918 can be accessed by the main memory 904 for use by the processing device 902. The main memory 904 (e.g., DRAM) is typically fast, but volatile, and thus a different type of storage than the data storage device 918 (e.g., an SSD), which is suitable for long-term storage, including while in an "off" condition. The instructions 926 or data in use by a user or the machine 900 are typically loaded in the main memory 904 for use by the processing device 902. When the main memory 904 is full, virtual space from the data storage device 918 can be allocated to supplement the main memory 904; however, because the data storage device 918 device is typically slower than the main memory 904, and write speeds are typically at least twice as slow as read speeds, use of virtual memory can greatly reduce user experience due to storage device latency (in contrast to the main memory 904, e.g., DRAM). Further, use of the data storage device 918 for virtual memory can greatly reduce the usable lifespan of the data storage device 918.

In contrast to virtual memory, virtual memory compression (e.g., the Linux™ kernel feature "ZRAM") uses part of the memory as compressed block storage to avoid paging to the data storage device 918. Paging takes place in the compressed block until it is necessary to write such data to the data storage device 918. Virtual memory compression increases the usable size of the main memory 904, while reducing wear on the data storage device 918.

Storage devices optimized for mobile electronic devices, or mobile storage, traditionally include MMC solid-state storage devices (e.g., micro Secure Digital (microSD™) cards, etc.). MMC devices include a number of parallel interfaces (e.g., an 8-bit parallel interface) with a host (e.g., a host device), and are often removable and separate components from the host. In contrast, eMMC™ devices are attached to a circuit board and considered a component of the host, with read speeds that rival serial ATA™ (Serial AT (Advanced Technology) Attachment, or SATA) based SSD devices. However, demand for mobile device performance continues to increase, such as to fully enable virtual or augmented-reality devices, utilize increasing networks speeds, etc. In response to this demand, storage devices have shifted from parallel to serial communication interfaces. Universal Flash Storage (UFS) devices, including controllers and firmware, communicate with a host using a low-voltage differential signaling (LVDS) serial interface with dedicated read/write paths, further advancing greater read/write speeds.

The instructions 924 may further be transmitted or received over a network 920 using a transmission medium via the network interface device 908 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 908 may include one or more physical jacks (e.g., Ethernet, coaxial, or phone jacks) or one or more antennas to connect to the network 920. In an example, the network interface device 908 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 900, and includes digital or analog communications signals or other intangible medium to facilitate communication of such software.

The above detailed description includes references to the accompanying drawings, which form a part of the detailed description. The drawings show, by way of illustration, specific embodiments in which the invention can be practiced. These embodiments are also referred to herein as "examples". Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, unless stated otherwise the term "or" is used to refer to a nonexclusive or, such that "A or B" may include "A but not B," "B but not A," and "A and B," unless otherwise indicated. In the appended claims, the terms "including" and "in which" are used as the plain-English equivalents of the respective terms "comprising" and "wherein". Also, in the following claims, the terms "including" and "comprising" are open-ended. A system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

In various examples, the components, controllers, processors, units, engines, or tables described herein can include, among other things, physical circuitry or firmware stored on a physical device. As used herein, "processor" means any type of computational circuit such as, but not limited to, a microprocessor, a microcontroller, a graphics processor, a digital signal processor (DSP), or any other type of processor or processing circuit, including a group of processors or multi-core devices.

Operating a memory cell, as used herein, includes reading from, writing to, or erasing the memory cell. The operation of placing a memory cell in an intended state is referred to herein as "programming," and can include both writing to or erasing from the memory cell (e.g., the memory cell may be programmed to an erased state).

According to one or more embodiments of the present disclosure, a memory controller (e.g., a processor, controller, firmware, etc.) located internal or external to a memory device, is capable of determining (e.g., selecting, setting, adjusting, computing, changing, clearing, communicating, adapting, deriving, defining, utilizing, modifying, applying, etc.) a quantity of wear cycles, or a wear state (e.g., recording wear cycles, counting operations of the memory device as they occur, tracking the operations of the memory device it initiates, evaluating the memory device characteristics corresponding to a wear state, etc.)

According to one or more embodiments of the present disclosure, a memory access device may be configured to provide wear cycle information to the memory device with each memory operation. The memory device control circuitry (e.g., control logic) may be programmed to compensate for memory device performance changes corresponding to the wear cycle information. The memory device may receive the wear cycle information and determine one or more operating parameters (e.g., a value, characteristic) in response to the wear cycle information.

Method examples described herein can be machine, device, or computer-implemented at least in part. Some examples can include a computer-readable medium, a device-readable medium, or a machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, the code can be tangibly stored on one or more volatile or non-volatile tangible computer-readable media, such as during execution or at other times. Examples of these tangible computer-readable media can include, but are not limited to, hard disks, removable magnetic disks, removable optical disks (e.g., compact discs and digital video disks), magnetic cassettes, memory cards or sticks, random access memories (RAMS), read only memories (ROMs), solid state drives (SSDs), Universal Flash Storage (UFS) device, embedded MMC (eMMC) device, and the like.

Additional Description and Examples

Example 1 includes subject matter (such as a memory device) comprising a memory array including memory cells; a communication interface to a host device; a memory control unit operatively coupled to the memory array and the communication interface. The memory control unit is configured to: encrypt write data received via the communication interface to produce encrypted data; program a portion of the memory cells of the memory array with the encrypted data; read the encrypted data from the portion of the memory cells in response to a memory read request; decrypt the read encrypted data to produce read data only for portions of the read encrypted data not stored in purged portions of the memory array.

In Example 2, the subject matter of Example 1 optionally includes a memory control unit is configured to transfer encrypted data via the communication interface for read encrypted data stored in purged regions of the memory array.

In Example 3, the subject matter of one or both of Examples 1 and 2 optionally includes a memory control unit configured to transfer specified purge data via the communication interface in place of read encrypted data stored in purged regions of the memory array.

In Example 4, the subject matter of one or any combination of Examples 1-3 optionally includes a memory control unit configured to map virtual memory addresses to the memory cells of the memory array; unmap portions of the memory cells of the memory array according to a memory discard indication received via the communication interface; and change an unmapped portion of the memory cells to the purged portion of the memory cells according to a memory purge indication received via the communication interface.

In Example 5, the subject matter of one or any combination of Examples 1-4 optionally includes a memory control unit configured to generate a reference structure indicating purged portions of memory cells; and omit decrypting the read encrypted data when the reference structure indicates an address of the read encrypted data is included in the purged portions of memory cells.

In Example 6, the subject matter of Example 5 optionally includes a memory control unit configured to generate a reference structure of unmapped portions of the memory cells according to a memory discard indication received via the communication interface; receive a memory purge indication via the communication interface; and generate the reference structure indicating purged portions of memory cells by indicating unmapped portions of the memory cells as purged portions of the memory cells according to the memory purge indication.

In Example 7, the subject matter of one or any combination of Examples 1-6 optionally includes a memory control unit configured to exclude from encryption a specified type of write data received via the communication interface.

In Example 8, the subject matter of one or any combination of Examples 1-7 optionally includes a memory control unit configured to exclude from encryption data to be written to specified memory addresses.

In Example 9, the subject matter of one or any combination of Examples 1-8 optionally includes a memory array with NAND type flash memory cells.

Example 10 includes subject matter (such as a method of programming multi-level memory cells of a memory array), or can optionally be combined with one or any combination of Examples 1-9 to include such subject matter comprising: receiving data to be written to a portion of memory cells of a memory array of the memory; encrypting the data to be written; programming the memory cells with the encrypted data; reading the encrypted data from the memory cells; decrypting the read encrypted data to produce read data only for portions of the read encrypted data not stored in purged regions of the memory array.

In Example 11, the subject matter of Example 10 optionally includes receiving data to be written from a host device, and transferring encrypted data to the host device as the read data for portions of the read encrypted data stored in the purged regions of the memory array.

In Example 12, the subject matter of Example 10 optionally includes receiving data to be written from a host device and transferring specified purge data to the host device in place of read encrypted data stored in purged regions of the memory array.

In Example 13, the subject matter of one or any combination of Examples 10-12 optionally includes mapping virtual memory addresses to memory cells of the memory array; unmapping portions of the memory cells of the memory array in response to a memory discard command; and including an unmapped portion of the memory cells in the purged regions of the memory array in response to a memory purge command.

In Example 14, the subject matter of one or any combination of Examples 10-13 optionally includes producing a table indicating purged portions of memory cells; and omitting the decrypting when the table indicates an address of the read data is included in the purged portions of memory cells.

In Example 15, the subject matter of Example 14 optionally includes producing a table of unmapped portions of the memory cells in response to a memory discard command; and changing unmapped portions to purged portions in response to a memory purge command.

In Example 16, the subject matter of one or any combination of Examples 10-15 optionally includes encrypting only a specified type of data to be written and excluding a different type of data from the encrypting.

Example 17 includes subject matter (such as a memory system) or can optionally be combined with one or more of Examples 1-16 to include such subject matter, comprising a host device and a memory device. The memory device including a memory control unit configured to: receive data to be written to a portion of memory cells of a memory array of the memory device; encrypt the data to be written; program the memory cells with the encrypted data; read the encrypted data from the portion of the memory cells; decrypt the read encrypted data to produce read decrypted data only for portions of the read encrypted data not stored in the purged regions of the memory array; and transfer the read decrypted data to the host device.

In Example 18, the subject matter of Example 17 optionally includes a memory control unit configured to receive the data to be written from the host device and transfer encrypted data to the host device as the read encrypted data.

In Example 19, the subject matter of one or both of Examples 17 and 18 optionally includes a memory control unit configured to receive the data to be written from a host device and transfer specified purge data to the host device in place of read encrypted data stored in the purged regions of the memory array.

In Example 20, the subject matter of one or any combination of Examples 17-19 optionally includes a memory control unit configured to: map virtual memory addresses to memory cells of the memory array; unmap portions of the memory cells of the memory array in response to receiving a memory discard command; and change an unmapped portion of the memory cells to the purged portion of the memory cells in response to receiving a memory purge command.

These non-limiting examples can be combined in any permutation or combination. The above description is intended to be illustrative, and not restrictive. For example, the above-described examples (or one or more aspects thereof) may be used in combination with each other. Other embodiments can be used, such as by one of ordinary skill in the art upon reviewing the above description. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The invention claimed is:

1. A memory device comprising:
   a memory array including memory cells;
   a communication interface to a host device;
   a memory control unit operatively coupled to the memory array and the communication interface, and configured to:
   encrypt write data received via the communication interface to produce encrypted data;
   program selected memory cells of the memory array with the encrypted data;
   designate one or more regions of the memory array as one or more purged regions of the memory array according to a memory purge indication received via the communication interface;
   read the encrypted data from the memory cells in response to a memory read request;
   decrypt the read encrypted data to produce read decrypted data when the memory read request is for data not stored in the one or more purged regions of the memory array; and
   omit decryption of the read encrypted data when the read request is for data stored in the one or more purged regions of the memory array.

2. The memory device of claim 1, wherein the memory control unit is configured to transfer encrypted data via the communication interface for portions of the read encrypted data stored in the purged regions of the memory array.

3. The memory device of claim 1, wherein the memory control unit is configured to transfer specified purge data via the communication interface in place of read encrypted data stored in the purged regions of the memory array.

4. The memory device of claim 1, wherein the memory control unit is configured to:
   map virtual memory addresses to the memory cells of the memory array;

unmap portions of the memory cells of the memory array according to a memory discard indication received via the communication interface; and change an unmapped portion of the memory cells to the purged portion of the memory cells according to a memory purge indication received via the communication interface.

5. The memory device of claim 1, wherein the memory control unit is configured to:

generate a reference structure indicating purged portions of memory cells; and omit decrypting the read encrypted data when the reference structure indicates an address of the read encrypted data is included in the purged portions of memory cells.

6. The memory device of claim 5, wherein the memory control unit is configured to:

generate a reference structure of unmapped portions of the memory cells according to a memory discard indication received via the communication interface;

receive a memory purge indication via the communication interface; and generate the reference structure indicating the purged portions of memory cells by indicating unmapped portions of the memory cells as purged portions of the memory cells according to the memory purge indication.

7. The memory device of claim 1, wherein the memory control unit is configured to exclude from encryption a specified type of write data received via the communication interface.

8. The memory device of claim 1, wherein the memory control unit is configured to exclude from encryption data to be written to specified memory addresses.

9. The memory device of claim 1, wherein the memory cells include NAND type flash memory cells.

10. A method of operating a memory, the method comprising:

receiving data to be written to a portion of memory cells of a memory array of the memory;

encrypting the data to be written;

programming the memory cells with the encrypted data;

designating one or more regions of the memory array as purged regions of the memory array according to a memory purge command;

reading the encrypted data from the memory cells in response to a memory read request;

decrypting the read encrypted data to produce read decrypted data when the memory read request is for data not stored in purged regions of the memory array; and omitting the decrypting of the read encrypted data when the memory read request is for data stored in the one or more purged regions of the memory array.

11. The method of claim 10, wherein receiving data to be written includes receiving data from a host device, and the method further includes transferring encrypted data to the host device as the read encrypted data for portions of the read encrypted data stored in the purged regions of the memory array.

12. The method of claim 10, wherein receiving data to be written includes receiving data from a host device, and the method further includes transferring specified purge data to the host device in place of read encrypted data stored in the purged regions of the memory array.

13. The method of claim 10, including:

mapping virtual memory addresses to memory cells of the memory array;

unmapping portions of the memory cells of the memory array in response to a memory discard command; and including an unmapped portion of the memory cells in the purged regions of the memory array in response to a memory purge command.

14. The method of claim 10, including:

producing a reference structure indicating purged portions of memory cells; and omitting the decrypting when the reference structure indicates an address of the read data is included in the purged portions of memory cells.

15. The method of claim 14, including:

wherein producing the reference structure indicating purged portions of memory cells includes producing a reference structure of unmapped portions of the memory cells in response to a memory discard command; and changing unmapped portions to purged portions in response to a memory purge command.

16. The method of claim 10, wherein encrypting data to be written includes encrypting only a specified type of data to be written and excluding a different type of data from the encrypting.

17. A memory system comprising:

a host device; and a memory device, the memory device including a memory control unit configured to:

receive data from the host device to be written to a portion of memory cells of a memory array of the memory device;

encrypt the data to be written;

program the memory cells with the encrypted data;

designate one or more regions of the memory array as one or more purged regions of the memory array;

read the encrypted data from the portion of the memory cells in response to a read operation; and decrypt the read encrypted data to produce read decrypted data when the memory read operation is for data not stored in the purged regions of the memory array; transfer the read decrypted data to the host device; and omit the decryption of the read encrypted data when the read request is for data stored in the one or more purged regions of the memory array.

18. The memory system of claim 17, wherein the memory control unit is configured to receive the data to be written from the host device, and transfer encrypted data to the host device as the read encrypted data.

19. The memory system of claim 17, wherein the memory control unit is configured to receive the data to be written from the host device, and transfer specified purge data to the host device in place of read encrypted data stored in the purged regions of the memory array.

20. The memory system of claim 17, wherein the memory control unit is configured to:

map virtual memory addresses to memory cells of the memory array;

unmap portions of the memory cells of the memory array in response to receiving a memory discard command; and change an unmapped portion of the memory cells to the purged portion of the memory cells in response to receiving a memory purge command.

* * * * *